United States Patent
Karlsson et al.

(10) Patent No.: US 12,305,137 B2
(45) Date of Patent: May 20, 2025

(54) METHOD AND SYSTEM FOR THE PRODUCTION OF LIQUID BIOGAS

(71) Applicant: BIOFRIGAS SWEDEN AB (PUBL), Gothenburg (SE)

(72) Inventors: Roger Karlsson, Ytterby (SE); Marcus Benzon, Lindome (SE)

(73) Assignee: BIOFRIGAS SWEDEN AB (PUBL), Gothenburg (SE)

( * ) Notice: Subject to any disclaimer, the term of this patent is extended or adjusted under 35 U.S.C. 154(b) by 261 days.

(21) Appl. No.: 17/916,142

(22) PCT Filed: Mar. 31, 2021

(86) PCT No.: PCT/SE2021/050297
§ 371 (c)(1),
(2) Date: Sep. 30, 2022

(87) PCT Pub. No.: WO2021/201763
PCT Pub. Date: Oct. 7, 2021

(65) Prior Publication Data
US 2023/0143266 A1 May 11, 2023

(30) Foreign Application Priority Data
Apr. 3, 2020 (SE) .................................. 2050381-9

(51) Int. Cl.
*C10L 3/10* (2006.01)
*B01D 53/14* (2006.01)
(Continued)

(52) U.S. Cl.
CPC .......... *C10L 3/104* (2013.01); *B01D 53/1468* (2013.01); *B01D 53/265* (2013.01);
(Continued)

(58) Field of Classification Search
None
See application file for complete search history.

(56) References Cited

U.S. PATENT DOCUMENTS 2,900,797 A * 8/1959 Kurata .................... F25J 3/061
95/290
4,252,548 A * 2/1981 Markbreiter .............. C07C 7/11
62/929
(Continued)

FOREIGN PATENT DOCUMENTS

CN 113881470 B * 4/2024 .............. C10L 3/103
DE 202010017546 U1 * 4/2012 ........... B01D 53/263
(Continued)

OTHER PUBLICATIONS

Swedish Search Report for Application No. 2050381-9 dated Oct. 8, 2020.
(Continued)

*Primary Examiner* — Jenna M Maroney
(74) *Attorney, Agent, or Firm* — MOSER TABOADA

(57) ABSTRACT

Methods for the production of liquid biogas (LBG) are disclosed. The methods may include the following steps: —inflow of crude gas comprising mainly methane and carbon dioxide; —removal of trace elements like hydrogen sulphide, siloxanes and VOC's from the crude gas; —dehumidification; —particle purification; for the production of a treated biogas; separation of carbon dioxide from the treated biogas; —condensation of the treated biogas with a low content of carbon dioxide, for the production of LBG with a carbon dioxide content of maximum 100 ppm, preferably at or close to atmospheric pressure the LBG is close to 100% pure methane with a carbon dioxide content of maximum 100 ppm, wherein the separation of carbon dioxide from the treated biogas involves freezing carbon dioxide in the treated biogas.

11 Claims, 1 Drawing Sheet

(51) Int. Cl.
*B01D 53/26* (2006.01)
*C10L 1/16* (2006.01)

(52) U.S. Cl.
CPC ............ *C10L 1/16* (2013.01); *B01D 2258/05* (2013.01); *C10L 2290/06* (2013.01); *C10L 2290/08* (2013.01); *C10L 2290/547* (2013.01); *C10L 2290/56* (2013.01); *F25J 2205/84* (2013.01); *F25J 2220/66* (2013.01); *F25J 2245/90* (2013.01)

(56) References Cited

U.S. PATENT DOCUMENTS

| | | | | |
|---|---|---|---|---|
| 4,681,612 | A * | 7/1987 | O'Brien | B01D 53/229 |
| | | | | 62/929 |
| 4,704,146 | A * | 11/1987 | Markbreiter | F25J 3/0266 |
| | | | | 62/929 |
| 5,681,360 | A * | 10/1997 | Siwajek | C07C 7/005 |
| | | | | 95/149 |
| 5,819,555 | A * | 10/1998 | Engdahl | F25J 3/0615 |
| | | | | 62/928 |
| 5,983,665 | A * | 11/1999 | Howard | F25J 1/0045 |
| | | | | 62/623 |
| 6,082,133 | A * | 7/2000 | Barclay | F25J 3/061 |
| | | | | 62/619 |
| 6,301,927 | B1 * | 10/2001 | Reddy | F25J 3/0252 |
| | | | | 62/619 |
| 8,673,056 | B2 * | 3/2014 | De Bas | B01D 53/885 |
| | | | | 62/619 |
| 10,408,534 | B2 * | 9/2019 | Kaminsky | B01D 7/02 |
| 10,760,024 | B2 * | 9/2020 | Foody | C10L 3/104 |
| 11,299,686 | B2 * | 4/2022 | Foody | B01D 53/62 |
| 11,300,022 | B2 * | 4/2022 | Jatkar | F01N 3/0205 |
| 11,471,823 | B2 * | 10/2022 | Roodbeen | B01D 53/225 |
| 11,578,545 | B2 * | 2/2023 | Kaminsky | C10L 3/12 |
| 2006/0248921 | A1 * | 11/2006 | Hosford | B01D 53/047 |
| | | | | 62/611 |
| 2010/0107684 | A1 * | 5/2010 | Minta | F25J 1/0297 |
| | | | | 62/623 |
| 2010/0292524 | A1 * | 11/2010 | Turner | C10L 3/08 |
| | | | | 585/800 |
| 2012/0111051 | A1 * | 5/2012 | Kulkarni | B01D 53/226 |
| | | | | 62/619 |
| 2013/0109767 | A1 * | 5/2013 | Bogild Hansen | C07C 1/0485 |
| | | | | 422/186.23 |
| 2013/0183705 | A1 | 7/2013 | Barclay et al. | |
| 2016/0090910 | A1 * | 3/2016 | Ploeger | F23R 3/36 |
| | | | | 60/39.465 |
| 2019/0128602 | A2 * | 5/2019 | Van Roosmalen | C10L 3/106 |
| 2020/0096254 | A1 | 3/2020 | Cardon et al. | |
| 2021/0055046 | A1 * | 2/2021 | Prince | F25J 3/0233 |
| 2021/0060486 | A1 * | 3/2021 | Prince | B01D 53/75 |
| 2021/0155864 | A1 * | 5/2021 | Foody | C12P 5/023 |
| 2021/0275961 | A1 * | 9/2021 | Foody | C10L 3/08 |
| 2021/0324282 | A1 * | 10/2021 | Foody | F17C 13/026 |

FOREIGN PATENT DOCUMENTS

| | | | | |
|---|---|---|---|---|
| EP | 1754695 | A1 * | 2/2007 | ......... B01D 53/002 |
| EP | 1811011 | A1 * | 7/2007 | ............. C10L 3/08 |
| EP | 3456810 | A1 | 3/2019 | |
| FR | 2978961 | A1 * | 2/2013 | ............. C01B 3/26 |
| FR | 3019761 | A1 * | 10/2015 | ........... B01D 53/04 |
| FR | 3050656 | A1 | 11/2017 | |
| FR | 3075660 | A1 * | 6/2019 | ........... B01D 5/006 |
| FR | 3081046 | A1 * | 11/2019 | ........... B01D 5/006 |
| KR | 20160134346 | A * | 11/2016 | |
| WO | WO-0046559 | A1 | 8/2000 | |
| WO | WO-2007021183 | A1 * | 2/2007 | ......... B01D 53/002 |
| WO | WO-2010/123598 | A1 | 10/2010 | |
| WO | WO-2018/072021 | A1 | 4/2018 | |
| WO | WO-2019030688 | A1 | 2/2019 | |
| WO | WO-2022101324 | A1 * | 5/2022 | ......... B01D 53/229 |
| WO | WO-2024119271 | A1 * | 6/2024 | |

OTHER PUBLICATIONS

Extended European Search Report for Application No. 21780392.3 dated Jan. 4, 2024.
Berg, Benjamin; Efficient liquid biomethane production with cryogenic upgrading; Gas for Energy, 207, Issue 1, pp. 26-29.
International Search Report for PCT/SE2021/050297 dated May 21, 2021.

* cited by examiner

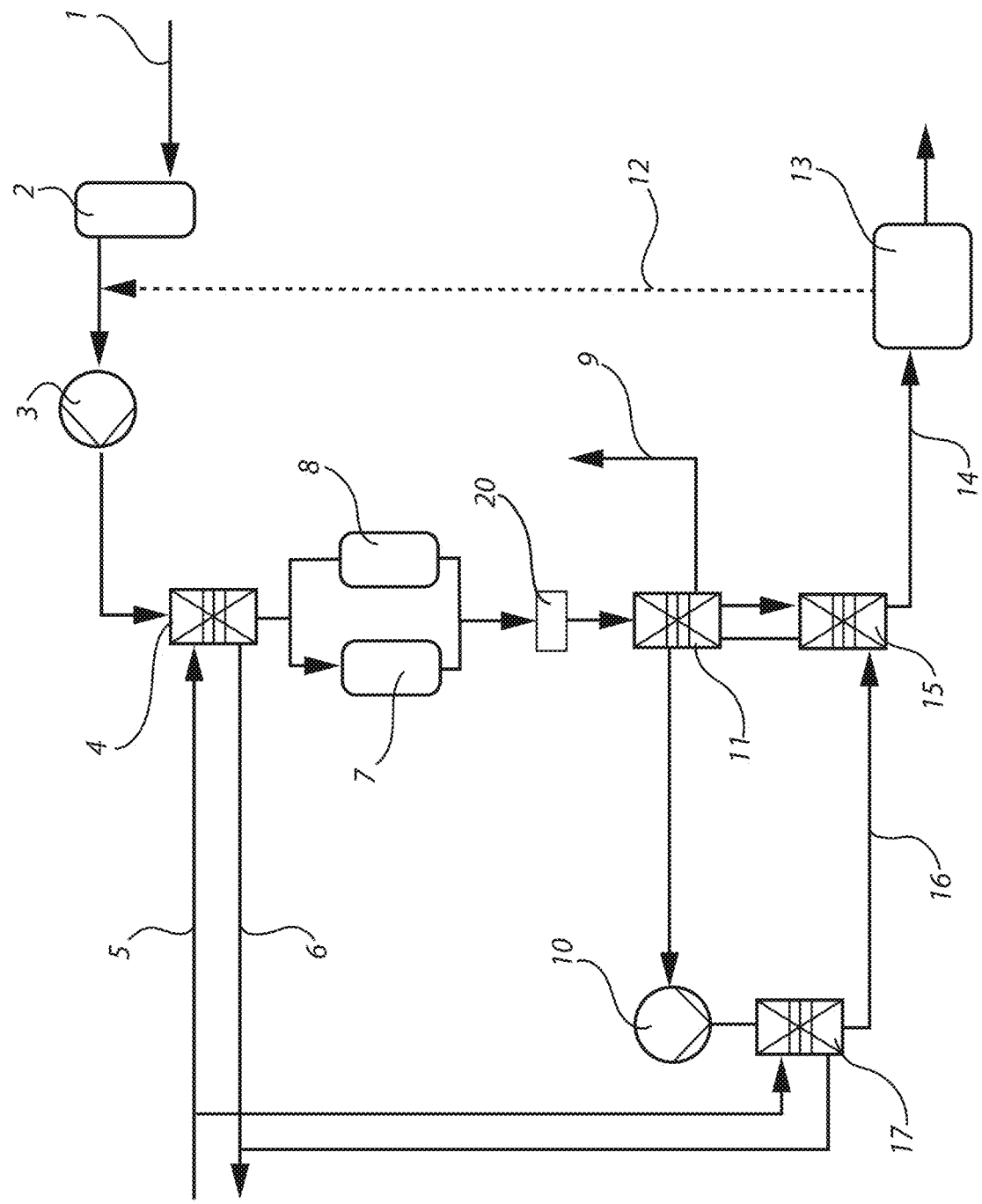

METHOD AND SYSTEM FOR THE PRODUCTION OF LIQUID BIOGAS

FIELD OF THE INVENTION

The present invention relates to a method and system for the production of liquid biogas (LBG).

SUMMARY OF THE INVENTION

The present invention is directed to a method for the production of liquid biogas (LBG), said method comprising the following steps:
  inflow of crude gas comprising mainly methane and carbon dioxide;
  removal of trace elements like hydrogen sulphide, siloxanes and VOC's from the crude gas;
  dehumidification;
  particle purification;
for the production of a treated biogas;
  separation of carbon dioxide from the treated biogas;
  condensation of the treated biogas with a low content of carbon dioxide, for the production of LBG with a carbon dioxide content of maximum 100 ppm, preferably at or close to atmospheric pressure the LBG is close to 100% pure methane with a carbon dioxide content of maximum 100 ppm, wherein the separation of carbon dioxide from the treated biogas involves freezing carbon dioxide in the treated biogas.

EMBODIMENTS OF THE PRESENT INVENTION

Below some specific embodiments of the present invention are provided and described further.

According to one embodiment, the process comprises flowing the produced LBG to a cryogenic storage tank. Such a cryogenic storage tank is a suitable alternative for a system according to the present invention, which system is intended to be provided in a mobile container and for small-scale production.

Different purification technologies are possible to use according to the present invention. According to on embodiment of the present invention, the removal of trace elements like hydrogen sulphide, siloxanes and VOC's from the crude gas is performed through at least one activated carbon filter. Furthermore, according to yet another specific embodiment, the particle purification is performed by mechanical filtration. It should be noted that also other filter alternatives may be possible to incorporate in a system according to the present invention.

Moreover, according to one embodiment, the dehumidification of the treated biogas is performed with a drying technology, preferably with an initial knock out drum for free water. This technology is robust and appropriate for usage of regenerated carbon dioxide from a freezer heat exchanger (see below) as heating medium.

As is understood from above, the method according to the present invention involves freezing of carbon dioxide to enable for removal of the same from the biogas. According to one specific embodiment, the steps of separation of carbon dioxide from the treated biogas, and condensation of the treated biogas with a low content of carbon dioxide, are performed via alternately heat exchanging so that the separation of carbon dioxide from the treated biogas is performed so that carbon dioxide is frozen and then separated off via sublimation; preferably wherein condensed treated biogas with a low content of carbon dioxide is flown to a cryogenic storage tank for storage of LBG with a carbon dioxide content of maximum 100 ppm.

The cooling system used may be of different type and comprise different units. According to one embodiment of the present invention, a cascade cooling system is used in which compression is performed in at least one reciprocating compressor. A cascade cooling system is an efficient alternative with use of a low evaporation temperature and a high volumetric efficiency for the compressor, when compared with a single stage technology.

Moreover, also the cooling medium being used has relevance. According to one specific embodiment of the present invention, a cooling medium is used being a mixed refrigerant in a cascade system suitable for freezing carbon dioxide and condensing methane, and wherein high temperature cooling in the cooling system is performed by use of water, preferably enabling heat recovery to be used in the process or for other heating purposes, such as for heating digesters, green houses or other heat requiring processes or workshops or housing areas. One possible embodiment in this regard is shown in FIG. 1.

To continue based on the embodiment shown in FIG. 1, the system according to the present invention is based on multiple heat exchangers in different positions. According to one embodiment, the steps of separation of carbon dioxide from the treated biogas, and condensation of the treated biogas with a low content of carbon dioxide, are supported by heat exchanging in at least two heat exchangers, one freezing the carbon dioxide and one in regeneration at the same time. Time and availability are factors here to ensure a high productivity. Therefore, according to yet another embodiment, at least three heat exchangers are used so that one is freezing the carbon dioxide and two are in regeneration at the same time. As such, one may be active for freezing, the other two may work side by side for regeneration, subsequent defrosting of the carbon dioxide and then decreasing the temperature again so that when one is full, then the process may switch to the other and use this instead.

One question of interest is how to physically ensure how to separate off the carbon dioxide. According to one specific embodiment, the separation of carbon dioxide from the treated biogas is performed by freezing carbon dioxide in the treated biogas and then filtering off carbon dioxide from the treated biogas. The carbon dioxide is removed from the freezing heat exchanger and follows the biogas stream as snowflakes. These snowflakes may then be captured in a filter and then subsequently separated off.

As may be understood, also the type of heat exchanger used for the freezing to enable removal of the snowflakes from the internal surface is a question. There are different technology alternatives that may come into play according to the present invention. Special plate heat exchangers are one such example. Another possible general type of interest is tubular heat exchangers. In relation to this it should also be noted that combinations of different types of heat exchangers are totally possible in a system according to the present invention.

Moreover, according to yet another embodiment, different forms of technologies may be applied to assist during the carbon dioxide freezing and regeneration. For instance, during the regeneration of carbon dioxide the compressor used may be assisted by a heating unit, e.g. an electrical heater. Moreover, under pressure may be used to create optimal conditions for the regeneration. Therefore, also units enabling to apply a vacuum or under pressure may be incorporated in a system according to the present invention.

According to one embodiment, the present invention is directed to use of a method according to the present invention, for the production of LBG in which the level of carbon dioxide is maximum 100 ppm.

Furthermore, the present invention is also directed to a system intended for the production of liquid biogas (LBG), said system comprising the following units:
- a removal unit for removal of trace elements like hydrogen sulphide, VOC's and siloxane;
- a unit for particle purification;
- a biogas compressor;
- at least two heat exchangers;
- a cooling water loop;
- a heating water loop:
- at least one dryer;
- a cooling system; and
- a LBG storage tank.

According to one preferred embodiment, the unit for particle purification is implemented subsequent to the at least one dryer, such as subsequent to the parallel driers arranged as shown in FIG. 1. As notable, there is no unit for particle purification shown in the embodiment shown in FIG. 1. This unit may be provided at different places, however suitably it is implemented after the driers. Moreover, suitably the unit for particle purification is a mechanical filter.

There are some key units and features included in a system according to the present invention. For instance, the cooling system, which in turn is connected to one cooling water loop and one heating water loop is one such key component. This cooling system also comprises one or more heat exchangers, suitably several ones as mentioned above. Moreover, with reference to FIG. 1, and the embodiment of a system according to the present invention shown therein, it should be noted that also other heat exchangers are suitably involved in the whole system. In FIG. 1 there are two heat exchangers involved in the loop where cooling water is used to submit heat and then becomes heating water (see FIG. 1). One of them then connects to the cooling system, which in turn suitably includes at least two heat exchangers, suitably at least three heat exchangers.

Moreover, according to one embodiment of the present invention, the cooling system comprises at least one refrigeration compressor, at least one heat exchanger and at least one refrigerant loop (see one example in FIG. 1). Again, suitably several heat exchangers are involved in the cooling system. According to one embodiment, the cooling system comprises at least three heat exchangers being one heat exchanger unit connected to the cooling water loop and the heating water loop, another heat exchanger unit arranged to provide carbon dioxide sublimation and desublimation and active or subsequent removal of carbon dioxide from treated biogas, and one heat exchanger unit arranged to provide condensation of the treated biogas with a low content of carbon dioxide and production of LBG in which the level of carbon dioxide is maximum 100 ppm. This has been further discussed above in relation to freezing and regeneration in the heat exchangers.

Moreover, according to yet another embodiment, the system also comprises a carbon dioxide filter arranged subsequent to one or more heat exchanger(s) arranged for freezing carbon dioxide in treated biogas. Such a possible filter is not shown in FIG. 1.

Furthermore, and as mentioned above, according to one embodiment, the cooling system is a cascade cooling system in which compression is performed in at least one reciprocating compressor.

Another advantage of the present invention relates to the possibility to arrange the system in a fixed volume. This opens up for the possibility to install a system unit according to the present invention in a simple way. Also the transportation to a specific site, and, when needed, to uninstall a unit and transporting it to a new site is enabled in a simple way. Based on the above, a system according to the present invention may be arranged inside of a mobile unit, preferably in a mobile container, more preferably in a container with a maximum size of 40 foot.

Moreover, in FIG. 1 there is shown a process scheme of one embodiment of the present invention.

With reference to FIG. 1 the following apply in accordance with the shown embodiment according to the present invention:
- 1—inflow of crude gas;
- 2—a removal unit for removal of trace elements like hydrogen sulphide, VOC's and siloxane, e.g. an active carbon filter;
- 3—biogas compressor;
- 4—first heat exchanger for heat exchanging with water;
- 5—cooling water;
- 6—heating water;
- 7, 8—dryers;
- 10—refrigeration compressor (part of the cooling system);
- 17—second heat exchanger (part of the cooling system);
- 11—third heat exchanger providing carbon dioxide freezing (part of the cooling system);
- 9—carbon dioxide being separated off (also possibly via filtration (filter not shown here, said filter then suitably being incorporated between heat exchangers 11 and 15));
- 15—fourth heat exchanger providing condensation of the treated biogas with a low content of carbon dioxide (part of the cooling system);
- 14—treated biogas with a low content of carbon dioxide;
- 13—LBG tank;
- 12—boil off recirculation;
- 16—cooling medium stream; and
- 20—particle purification mechanical filter.

Based on the FIG. 1 it should also be clear how different components may be connected to each other and a suitable order.

Untreated biogas (crude gas 1) is flown into the system according to a present invention by use of a compressor 3. As seen, a removal unit 2, e.g. an active carbon filter, intended to remove impurities is arranged before the compressor 3. The purified gas is then cooled in a first heat exchanger 4 (see streams cooling water 5 and heating water 6). The gas is dried in one or more driers, in this case driers 7 and 8.

The gas is then cooled in a heat exchanger 11 so that the carbon dioxide is frozen and may be separated off (see stream 9). This is accomplished by the cooling system or loop including the refrigeration compressor 10 and also heat exchanger 17.

As may be seen, in this case the cooling system or cooling loop thereof comprises three heat exchangers 17, 11 and 15. It should be noted this part of the system may in fact comprise several heat exchangers and/or phase separators. As one example of interest, then at least one phase separator is included. Moreover, and as mentioned above, the freezing of carbon dioxide may be performed in two or three heat exchangers just in itself. Furthermore, as hinted above, the system may also involve a filter enabling removal of carbon dioxide which has followed the stream of gas as snowflakes or the like. Moreover, the system may also involve a polisher unit before the condensation of the methane. Therefore, with reference to FIG. 1, one heat exchanger depicting a certain step may in fact involve multiple heat exchangers as such.

It should be noted that the system suitably is a mixt refrigerant closed loop process in which an external cooling medium is used to cool the gas so that it condenses. The cooling medium may for instance comprise a mixture of one or more suitable gases.

As seen, one or more heat exchangers 15 is intended for the condensation of methane (see flow 14), which then is flown to the storage LBG tank 13. The LBG tank 13 in turn has a boil off recirculation 12, suitably connecting back to a position before the biogas compressor 3.

The invention claimed is:

1. A method for production of liquid biogas (LBG), said method comprising:
   inflow of crude gas comprising mainly methane and carbon dioxide;
   removal of trace elements being at least one of hydrogen sulphide, siloxanes and VOC's from the crude gas, which is performed through at least one activated carbon filter;
   wherein a biogas compressor is arranged subsequent to said at least one activated carbon filter;
   a first heat exchanger for heat exchanging with water arranged subsequent to the biogas compressor; and
   at least one dryer is arranged subsequent to said first heat exchanger;
   dehumidification;
   particle purification by mechanical filtration for the production of a treated biogas;
   separation of carbon dioxide from the treated biogas;
   condensation of the treated biogas with a low content of carbon dioxide, for the production of LBG with a carbon dioxide content of maximum 100 ppm, wherein the separation of carbon dioxide from the treated biogas; and
   condensation of the treated biogas with a low content of carbon dioxide are performed via alternatively heat exchanging so that the separation of carbon dioxide from the treated biogas is performed so that carbon dioxide is frozen and then separated off via sublimation,
   wherein a cascade cooling system is used in which compression is performed in at least one reciprocating compressor, and
   wherein the cascade cooling system comprises at least two heat exchangers being a second heat exchanger and a third heat exchanger, and which cascade cooling system is connected to a cooling water loop and a heating water loop, which cascade cooling system is arranged subsequent to said at least one dryer.

2. The method according to claim 1, wherein the method comprises flowing the produced LBG to a cryogenic storage tank.

3. The method according to claim 1, wherein the dehumidification of the treated biogas is performed with an initial knock out drum for free water.

4. The method according to claim 1, wherein a cooling medium is used being a mixed refrigerant in the cascade cooling system suitable for freezing carbon dioxide and condensing methane, and wherein high temperature cooling in the cascade cooling system is performed by use of water.

5. The method according to claim 1, wherein the separation of carbon dioxide from the treated biogas; and condensation of the treated biogas with a low content of carbon dioxide,
   are supported by heat exchanging in at least two heat exchangers, wherein at least one of the second or third heat exchanger is utilized for freezing the carbon dioxide and another fourth heat exchanger is utilized in regeneration at the same time.

6. The method according to claim 5, wherein at least three heat exchangers are used so that at least one of the second or third heat exchanger is utilized for freezing the carbon dioxide and the fourth heat exchanger comprises two heat exchangers utilized in regeneration at the same time.

7. The method according to claim 1, wherein the separation of carbon dioxide from the treated biogas is performed by freezing carbon dioxide in the treated biogas and then filtering off carbon dioxide from the treated biogas.

8. A system intended for production of liquid biogas (LBG), said system comprising the following units:
   an inflow for crude gas
   a removal unit for removal of trace elements being at least one of hydrogen sulphide, VOC's and siloxane, which removal unit is at least one activated carbon filter, and which is arranged subsequent to the inflow for crude gas;
   a biogas compressor, arranged subsequent to said at least one activated carbon filter;
   a first heat exchanger for heat exchanging with water arranged subsequent to the biogas compressor;
   at least one dryer arranged subsequent to said first heat exchanger;
   a unit for particle purification which is a mechanical filter, and which is implemented subsequent to at least one dryer;
   a cascade cooling system in which compression is performed in at least one reciprocating compressor, wherein the cascade cooling system comprises at least two heat exchangers being a second heat exchanger and a third heat exchanger, and which cascade cooling system is connected to a cooling water loop and a heating water loop, which cascade cooling system is arranged subsequent to said at least one dryer; and
   a LBG storage tank arranged to store treated biogas with a low content of carbon dioxide.

9. The system according to claim 8, wherein the cascade cooling system comprises a fourth heat exchanger arranged to provide condensation of the treated biogas with a low content of carbon dioxide and production of LBG in which the low content of carbon dioxide is maximum 100 ppm.

10. The system according to claim 8, wherein the system also comprises a carbon dioxide filter arranged subsequent to one or more heat exchanger(s) arranged for freezing carbon dioxide in treated biogas.

11. The system according to claim 8, wherein the system is arranged inside of a mobile unit.

* * * * *